(12) United States Patent
Luebbers et al.

(10) Patent No.: US 8,505,238 B2
(45) Date of Patent: Aug. 13, 2013

(54) VERTICAL AEROPONIC PLANT GROWING SYSTEM

(76) Inventors: Terry Luebbers, Lagrange, GA (US);
Sarah Hensley, Lagrange, GA (US)

( * ) Notice: Subject to any disclaimer, the term of this patent is extended or adjusted under 35 U.S.C. 154(b) by 58 days.

(21) Appl. No.: 13/115,635

(22) Filed: May 25, 2011

(65) Prior Publication Data

US 2012/0297678 A1    Nov. 29, 2012

(51) Int. Cl.
*A01G 31/02*    (2006.01)

(52) U.S. Cl.
USPC .......................................................... 47/62 A

(58) Field of Classification Search
USPC .................................. 47/59 R, 60, 62 A, 62 R
See application file for complete search history.

(56) References Cited

U.S. PATENT DOCUMENTS

| | | | |
|---|---|---|---|
| 3,812,616 A | 5/1974 | Koziol | |
| 3,931,695 A | 1/1976 | Widmayer | |
| 4,057,933 A | 11/1977 | Enyeart | |
| 4,059,922 A | 11/1977 | Digiacinto | |
| 4,075,852 A | 2/1978 | Tamaro | |
| 4,076,431 A | 2/1978 | Burvall | |
| 4,209,943 A | 7/1980 | Hunt | |
| 4,332,105 A | 6/1982 | Nir | |
| 4,514,930 A | 5/1985 | Schorr et al. | |
| 4,869,019 A | 9/1989 | Ehrlich | |
| 7,080,482 B1 * | 7/2006 | Bradley | 47/60 |
| 2006/0156624 A1 * | 7/2006 | Roy et al. | 47/62 R |

* cited by examiner

*Primary Examiner* — Frank T Palo
(74) *Attorney, Agent, or Firm* — Harry I. Leon; Vivian L. Steadman

(57) ABSTRACT

An aeroponic plant growing system with vertically aligned planting sites. The system includes a plurality of plant-holding containers, a walled enclosure, and a fluid dispenser housed therein. One of the enclosure's walls defines a plant-supporting frame on which are formed horizontally extending, outwardly-facing grooves and their respective inwardly-projecting ridges. Tapered between its distal ends, each container can be individually received within one of a plurality of spaced apart orifices defined by each groove. So received, the container extends into the enclosure and a substantial portion of the container's transverse cross-section most distal from its wider end is cantilevered over each horizontally extending ridge situated downwardly of that particular container's interface with the frame, thus positioning, in use, the taproots of large numbers of plants within a barrier-free, vertical corridor of extremely narrow footprint down which their roots can grow both aeroponically and gravitropically.

9 Claims, 2 Drawing Sheets

VERTICAL AEROPONIC PLANT GROWING SYSTEM

BACKGROUND OF THE INVENTION

The present invention generally relates to an aeroponic plant growing system. More particularly, the present invention relates to an aeroponic plant growing system which allows for a vertical alignment of planting sites so that plants can be grown in a fraction of the space necessary for traditional hydroponic or aeroponic applications.

Indoor cultivation of fruits, vegetables, flowers, and ornamental plants has increased considerably in recent years. Aeroponic plant growing is one of the recent methods of indoor cultivation that is increasing in popularity. The aeroponics method grows the plants in an air or mist environment without the use of soil or an aggregate medium. In this method, the roots of the plant are exposed to an atomized nutrient solution, with the leaves and crown extending above a container holding the plant. Various aeroponic plant growing systems are commercially available. Unfortunately, in the known aeroponic systems, the containers are placed on the frame at a fixed angle or horizontal alignment limiting the capacity and size of the aeroponic system.

As can be seen, there is a need for an aeroponic system including containers that are removable from the frame. In addition, there is a need to provide an aeroponic system in which the container's alignment is vertical.

SUMMARY OF THE INVENTION

In one aspect of the present invention, an aeroponic system includes a vertical housing having at least one wall which defines a plant-supporting frame as well as a plurality of orifices formed therein, a fluid dispenser located in the interior of the vertical housing, and a plurality of plant-holding containers, each container, when it is supported by the frame, being individually received within one of the orifices and held at an angle of approximately 45 degrees to the horizontal; the plurality of containers, when each of them is simultaneously supported by the frame, defining a horizontally and vertically extending array in which rows of containers are vertically aligned with each other.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide an aeroponic plant growing system for allowing vertical growth of plants in a fraction of the space necessary for traditional plant growing.

Figure 1:
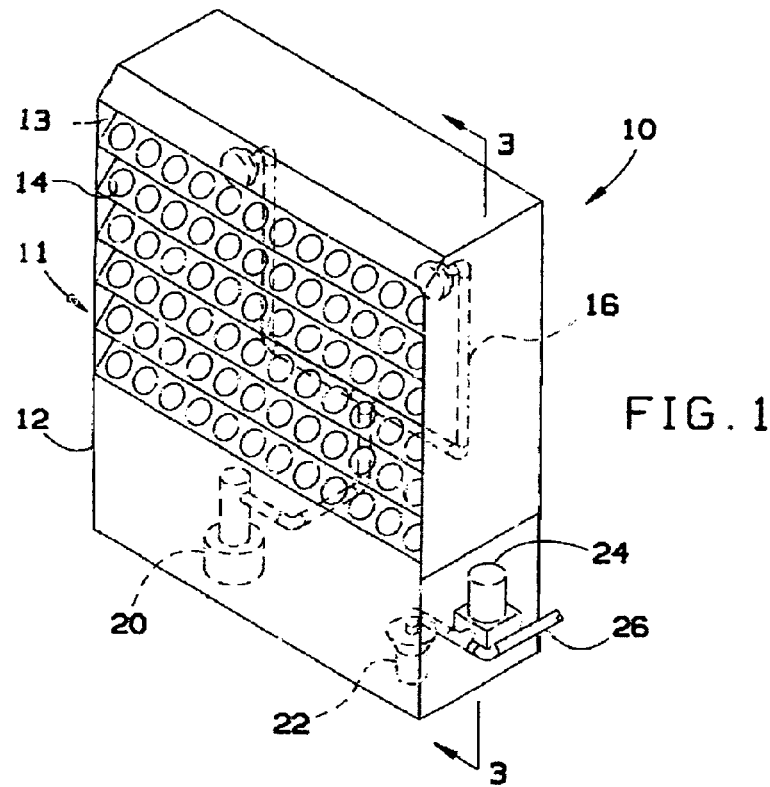
FIG. 1 illustrates a perspective front view of an aeroponic system according to an exemplary embodiment of the present invention.
Figure 2:
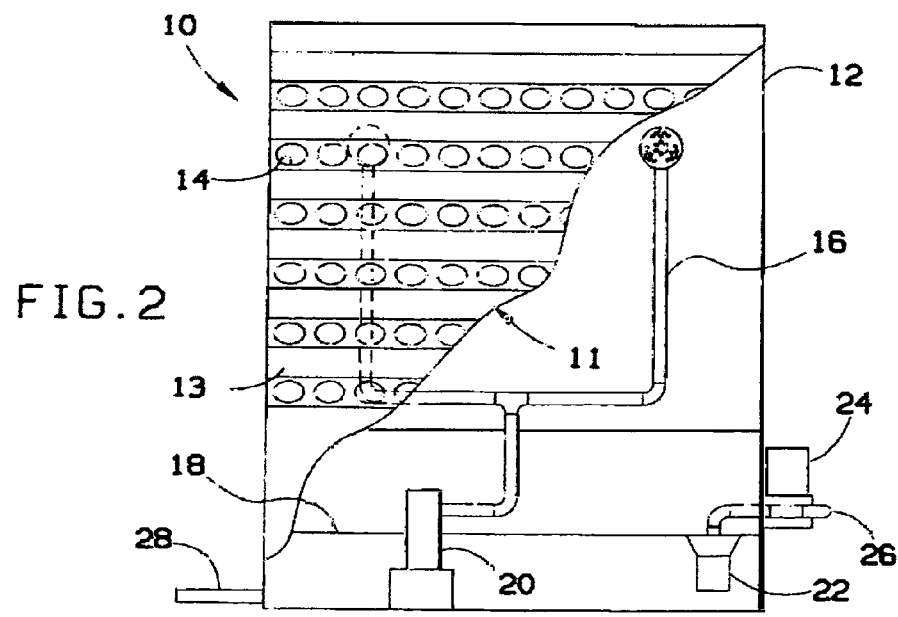
FIG. 2 illustrates a detailed front view of the aeroponic system of FIG. 1.
Figure 3:
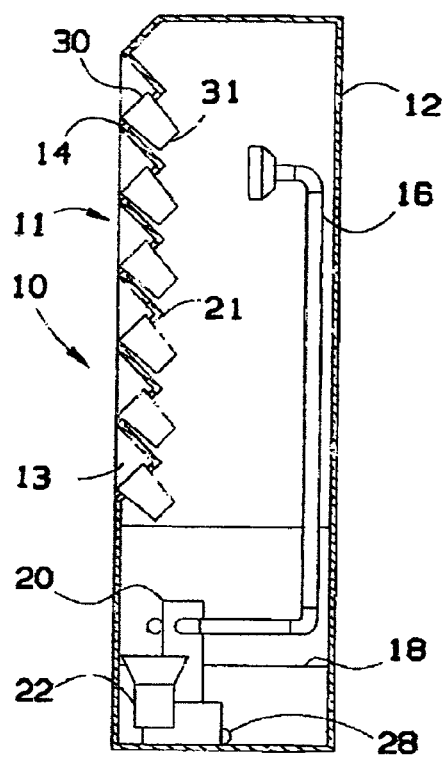
FIG. 3 illustrates a cross-sectional view of the aeroponic system of the present invention taken along line 3-3 in FIG. 1.

FIGS. 1-3 illustrate an aeroponic system 10 according to an exemplary embodiment of the present invention. The aeroponic system 10 includes a vertical housing 12 having at least one front-facing or back-facing wall which defines a plant-supporting frame 11 in which is formed a plurality of horizontally extending grooves 13. Each groove 13 includes an outwardly-facing pair of upper and lower surface members which are disposed perpendicularly to each other and which together form a horizontally extending, inwardly-projecting ridge 21 which is one of a plurality of such ridges disposed on the plant-supporting frame's interior face. Made of a non-corrosive material, the housing 12 may be fabricated from plastic, stainless steel, non-corrosive metals, polymeric material, or composite material. The size of the vertical housing 12 depends upon the individual user's preferences.

The plant-supporting frame 11 defines a plurality of orifices 14. The size of the orifices 14 preferably depends upon the type of plant (not shown) to be grown.

In use, the narrow end 31 of a container 30 with generally tapered sides can be removably received within each orifice 14 of the plant-supporting frame 11, thus allowing the user to easily add and remove the plants (not shown) from the frame. The narrow ends 31 of a plurality of containers 30, when they are held individually within each of the orifices 14, are vertically aligned inside the vertical housing 12 (FIG. 3). By aligning the planting orifices 14 in a vertical manner, one greatly increases flexibility in the size in the footprint of the growing unit while maintaining the original number of planting sites. In prior art applications, the size of the overall unit has to increase horizontally in order to increase the number of planting sites; and if decreased, planting sites also decrease.

The plant seeds or cuttings may be first germinated or rooted in growth cubes (not shown) such as pressed peat. Once roots are visible on the outside of the cubes, the plants (not shown) are transferred to the containers 30 and held therein by their roots, with each plant's root facing the interior of the vertical housing 12. The plants (not shown) may be held in place inside the container 30 with the use of inert clay pellets or similar material. The size of the container 30 may depend on the size of the orifices 14 and the size of the plant (not shown). Made of a sturdy material, the container 30 may be fabricated from plastic, carton, metal, wood, light rubber, polymer, or composite material.

A reservoir 18 placed inside the vertical housing 12 or built into its structure is employed to recapture and reuse nutrient solution. Located at the bottom end or, alternately, at the top end of the vertical housing 12, the reservoir 18 is adapted to receive and hold a fluid such as water and/or a nutrient solution. The size of the reservoir 18 depends upon, among other things, the size of the vertical housing 12 and the number of orifices 14. The fluid may be applied to the roots of the plants (not shown) by using a fluid dispenser 16.

The fluid dispenser 16 may be a commercially available sprayer, nozzle, or a fogger. The angle of the fluid dispenser 16, as well as its height, may be adjustable.

In the embodiment illustrated in FIGS. 1-5, the fluid dispenser 16 is operated by a pump 20 located inside a reservoir 18 disposed at the bottom end of the housing 12. The pump 20 may be a commercially available fluid pump; and it may be manually operated by the user or set on a cycle timer for automatic operation. A float valve 22, placed inside the reservoir 18 and connected to an injector 24 and to a fresh water line 26, may be employed to maintain the water/nutrient level. The float valve may be a commercially available float valve. The injector 24 may automatically maintain proper nutrient levels by adding the proper amount of nutrients along with fresh water to the reservoir 18. In order to facilitate the recycling of nutrient solution inside the reservoir 18, it is preferably equipped with a drain device 28 to help discard fluid solution from the reservoir.

In some embodiments, the reservoir 18 may be located at the top end of the vertical housing 12. In such an embodiment, the fluid dispenser 16 may be operated manually with the use of gravity.

Figure 4:
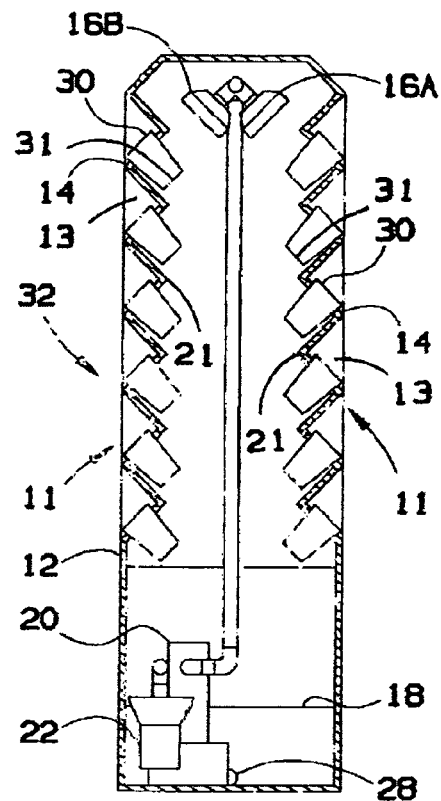
FIG. 4 illustrates a sectional view of an aeroponic system according to another exemplary embodiment of the present invention.

FIG. 4 illustrates an alternate embodiment of the aeroponic system 32. In this embodiment, the vertical housing 12 defines plant-supporting frames 11 with orifices 14 on both the housing's front-facing and back-facing walls. The fluid dispenser 16 preferably includes a first nozzle head 16A and a second nozzle head 16B, which are directed towards the vertical housing's front-facing wall and its back-facing wall, respectively. In this embodiment, a central sprayer device may be used to evenly distribute the nutrient solution to both sides of the vertical housing 12.

Figure 5:
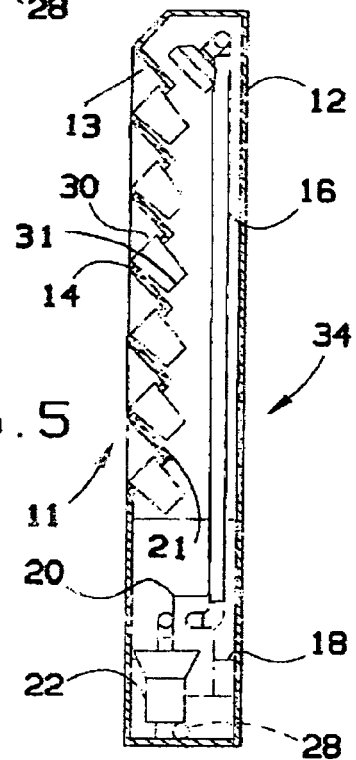
FIG. 5 illustrates a sectional view of an aeroponic system according to another exemplary embodiment of the present invention.

FIG. 5 illustrates an alternate embodiment of the aeroponic system 34. In this embodiment, the depth of the vertical housing 12 may be reduced to 9 inches, thus reducing the amount of space it uses as compared to the aeroponic system 10 without reducing the number of planting sites.

A filter (not shown) may be added to the fluid dispenser 16 to prevent clogging.

It should be understood, of course, that the foregoing relates to exemplary embodiments of the invention and that modifications may be made without departing from the spirit and scope of the invention as set forth in the following claims.

What is claimed is:

1. An aeroponic plant growing system comprising:
   (a) a housing including front-facing and back-facing vertical walls, opposed vertical side walls, and top and bottom end walls which are interconnected to form an enclosure;
   (b) at least one of the front-facing or back-facing vertical walls defining a plant-supporting frame, the frame including a plurality of horizontally extending, outwardly-facing grooves, each groove including an outwardly-facing, contiguous pair of upper and lower surface members, the lower surface member being disposed perpendicularly to the upper surface member and forming a horizontally extending, inwardly-projecting ridge therewith, each inwardly-projecting ridge so formed which is situated beneath another such inwardly projecting ridge being disposed virtually plumb with it;
   (c) the plant-supporting frame defining a plurality of horizontally spaced apart orifices formed in each of the lower surface members;
   (d) a plurality of plant-holding containers, each of which, between its distal ends, decreases in transverse cross-sectional area; each container's narrow end defining at least opening for receiving a plant's taproot as it grows from within the container;
   (e) means, including the frame, for supporting each of the containers at only its wider end, with most of the container, when it is so supported, being individually received within one of the orifices, so that the container extends into the enclosure; a substantial portion of the container's transverse cross-section most distal from its wider end being cantilevered, in use, over each of the inwardly-projecting ridges formed by the grooves and situated downwardly of the lower surface member in which the orifice receiving the container is formed; and
   (f) a fluid dispenser located within the enclosure.

2. The aeroponic plant growing system according to claim 1, which further includes a reservoir fluidly connected to the fluid dispenser.

3. The aeroponic system according to claim 1, wherein the fluid dispenser is a sprayer, wherein the sprayer is single or double sided.

4. The aeroponic plant growing system according to claim 1, wherein the fluid dispenser includes a fogger.

5. The aeroponic plant growing system according to claim 1, wherein the fluid dispenser is operated by a pump or by gravity.

6. The aeroponic plant growing system according to claim 1, which further comprises a pump and means, including a timer, for automatically activating or deactivating the pump.

7. The aeroponic plant growing system according to claim 1, wherein said portion of the container's trans-verse cross-section which is so cantilevered, in use, is curved downwardly in such a way that fluid tends to drain off of the container's narrow end.

8. The aeroponic plant growing system according to claim 1, wherein each container is further characterized as being generally frusto-conical in shape.

9. The aeroponic plant growing system according to claim 1, wherein each of the narrow ends, when one of them is individually received within each of the orifices, is part of an array of such narrow ends which form vertically separated rows of horizontally spaced apart elements for supporting roots growing from within the containers and into the enclosure.

* * * * *